United States Patent
Kim

(10) Patent No.: US 12,498,216 B2
(45) Date of Patent: Dec. 16, 2025

(54) LAMP SYSTEM CAPABLE OF DETECTING STEREOSCOPIC SHAPE OF ROAD SURFACE

(71) Applicant: HYUNDAI MOBIS CO., LTD., Seoul (KR)

(72) Inventor: Myeong Je Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 173 days.

(21) Appl. No.: 18/484,854

(22) Filed: Oct. 11, 2023

(65) Prior Publication Data
US 2024/0142226 A1 May 2, 2024

(30) Foreign Application Priority Data
Oct. 26, 2022 (KR) .......................... 10-2022-0139123

(51) Int. Cl.
*G01B 11/25* (2006.01)
*B60Q 1/08* (2006.01)

(52) U.S. Cl.
CPC ............ *G01B 11/254* (2013.01); *B60Q 1/085* (2013.01)

(58) Field of Classification Search
CPC ..... G01B 11/14; G01B 11/00; G01B 11/2513; G01B 11/25; G01B 11/254; G01B 11/24; G01B 11/2518; G01B 11/002; G01B 11/2536; G01B 11/16; G01B 11/2531; G01B 11/022; G01B 11/026; G01B 11/22; G01B 11/26; G01B 11/30; G01B 11/005; G01B 11/2509; G01B 11/2545; G01B 7/16; G01B 11/2433; G01B 11/2504; G01B 17/06; G01B 2210/52; G01B 5/04; G01B 9/02083; G01B 9/02091
See application file for complete search history.

(56) References Cited

U.S. PATENT DOCUMENTS

| | | | | |
|---|---|---|---|---|
| 3,894,802 | A | * | 7/1975 | Higgins ............. G01B 11/2509 359/464 |
| 11,828,954 | B2 | * | 11/2023 | Huang ..................... G01C 3/08 |
| 2014/0321711 | A1 | | 10/2014 | Lee et al. |
| 2021/0123723 | A1 | * | 4/2021 | Yu ......................... G01B 5/0014 |

FOREIGN PATENT DOCUMENTS

| | | | | |
|---|---|---|---|---|
| EP | 0449210 | A2 * | 10/1991 | ........... H04N 25/443 |
| JP | 2000292131 | A * | 10/2000 | |
| JP | 2001119620 | A * | 4/2001 | |

(Continued)

*Primary Examiner* — Michael P Stafira
(74) *Attorney, Agent, or Firm* — NovoTechIP International PLLC

(57) ABSTRACT

A lamp system capable of detecting a stereoscopic shape of a road surface includes: a light projecting device including a light source that generates patterned light having a specific pattern and projects the patterned light onto a projection surface; a sensor unit including a camera that captures a pattern in which the patterned light is projected onto the projection surface to provide an image of the projection surface; and a control unit that determines a three-dimensional shape of the projection surface based on an output of the sensor unit, and controls an output of the light projecting device according to the determined three-dimensional shape of the projection surface.

8 Claims, 10 Drawing Sheets

(56) References Cited

FOREIGN PATENT DOCUMENTS

| JP | 4137212 B2 * | 8/2008 | |
|---|---|---|---|
| KR | 20120005127 A * | 1/2012 | ........... H04N 13/341 |
| KR | 101780813 B1 * | 9/2017 | |
| WO | WO-2019044537 A1 * | 3/2019 | ............. G02B 26/10 |
| WO | WO-2019066724 A1 * | 4/2019 | ............. G01B 11/25 |

* cited by examiner

Depth from ray-plane triangulation:
- Intersect camera ray with light plane $$x = x'z/f$$
$$x = y'z/f$$
$$z = \frac{-Df}{Ax' + By' + Cf}$$

LAMP SYSTEM CAPABLE OF DETECTING STEREOSCOPIC SHAPE OF ROAD SURFACE

CROSS-REFERENCE TO RELATED APPLICATIONS

This application claims priority under 35 U.S.C. § 119 to Korean Patent Application No. 10-2022-0139123, filed on Oct. 26, 2022, in the Korean Intellectual Property Office, the disclosure of which is incorporated herein by reference in its entirety.

TECHNICAL FIELD

The following disclosure relates to a lamp system, and more particularly, to a lamp system capable of detecting a stereoscopic shape of a road surface using patterned light.

BACKGROUND

Recently, intelligent headlamps, which place great importance on safety, have been actively developed as headlamps for vehicles around the world, and the headlamps for vehicles have evolved along with the development of lighting technology using electricity. New types of light sources such as a sealed beam lamp using a headlamp like a single filament bulb, a halogen lamp using halogen gas, and a high-intensity discharge (HID) lamp in a high-voltage discharge type have emerged in succession. Since the 21st century, light emitting diode (LED) lamps using light emitting diodes have been greatly spotlighted.

Accordingly, the high-resolution LED market is increasingly expanding, and the application for projecting an image on a road is increasingly expanding. Meanwhile, in a case where a headlamp shows road surface information as illustrated in FIG. 1, an image is distorted because the image is changed by a stereoscopic shape of a projection surface. The distortion may occur because the angle of incidence of the light source is changed by the stereoscopic shape of the projection surface.

SUMMARY

An embodiment of the present invention is directed to providing a lamp system capable of detecting a stereoscopic shape of a road surface using patterned light to recognize a stereoscopic shape of a projection surface and automatically make a correction according to the stereoscopic shape of the projection surface for the purpose of user's convenience.

In one general aspect, a lamp system capable of detecting a stereoscopic shape of a road surface using patterned light is a lamp system provided in a mobile body, the lamp system including: a light projecting device including a light source that generates patterned light having a specific pattern and projects the patterned light onto a projection surface; a sensor unit including a camera that captures a pattern in which the patterned light is projected onto the projection surface to provide an image of the projection surface; and a control unit that calculates a three-dimensional shape of the projection surface based on an output of the sensor unit, and controls an output of the light projecting device according to the calculated three-dimensional shape of the projection surface.

The control unit may provide one-line data of pattern data about the patterned light to the light projecting device during a horizontal synchronization (HSYNC) period, and provide one-frame data to the light projecting device during one vertical synchronization (VSYNC) period, so that the patterned light is generated by the light projecting device.

The control unit may control the light projecting device so that the light projecting device outputs light with a plurality of patterns having different widths at predetermined time intervals.

The control unit may control the light projecting device so that the light projecting device outputs the patterned light between predetermined image frames rather than outputting light with a plurality of patterns.

The control unit may calculate the three-dimensional shape of the projection surface by extracting an image including the pattern among input images of the projection surface, and analyzing the extracted image.

The control unit may calculate the three-dimensional shape of the projection surface by deriving an equation of a straight line and an equation of a plane in a three-dimensional space for each pixel on the pattern, and calculating a coordinate value of a point in the three-dimensional image based on an intersection point between the point on the pattern and the derived plane.

The control unit may detect a tilt of the projection surface based on stereoscopic information on the projection surface, and correct the output of the light projecting device based on the tilt of the projection surface.

The control unit may detect a tilt of the projection surface based on stereoscopic information on the projection surface, and control a projection angle of the light projecting device by operating a leveling motor included in the mobile body.

The control unit may detect different stereoscopic surfaces of the projection surface based on stereoscopic information on the projection surface, and control the light projecting device to project different images on the different stereoscopic surfaces, respectively.

The lamp system capable of detecting a stereoscopic shape of a road surface according to several embodiments of the present invention as described above is capable of detecting a stereoscopic shape of a projection surface so that a non-distorted image can be provided regardless of the stereoscopic shape of the projection surface.

DETAILED DESCRIPTION

The present invention, the advantages in the operation of the present invention, and the objects accomplished by implementing the present invention will be described with reference to preferred embodiments of the present invention exemplified hereinbelow.

First, it should be noted that terms used herein are used only to describe the specific embodiments and are not intended to limit the present invention. Singular expressions may include plural expressions unless the context clearly indicates otherwise. It should also be noted that terms "include", "have", and the like used herein are intended to specify the presence of stated features, numbers, steps, operations, components, parts, or combinations thereof but do not preclude the presence or addition of one or more other features, numbers, steps, operations, components, parts, or combinations thereof.

In describing the present invention, a detailed description of a related known configuration or function that may obscure the gist of the present invention will be omitted.

Figure 1:
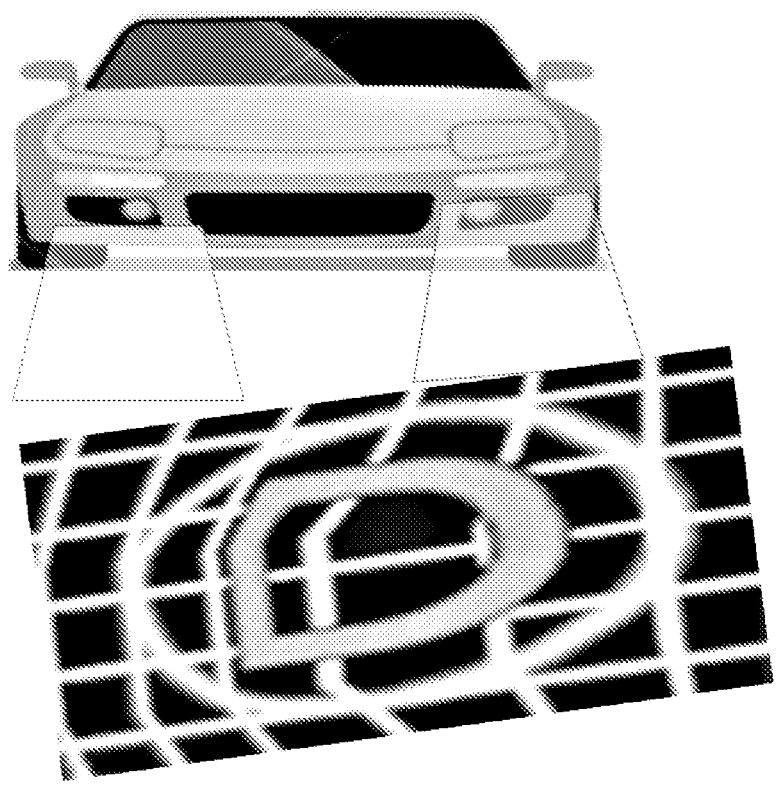
FIG. 1 is a diagram illustrating a conventional art.
Figure 2:
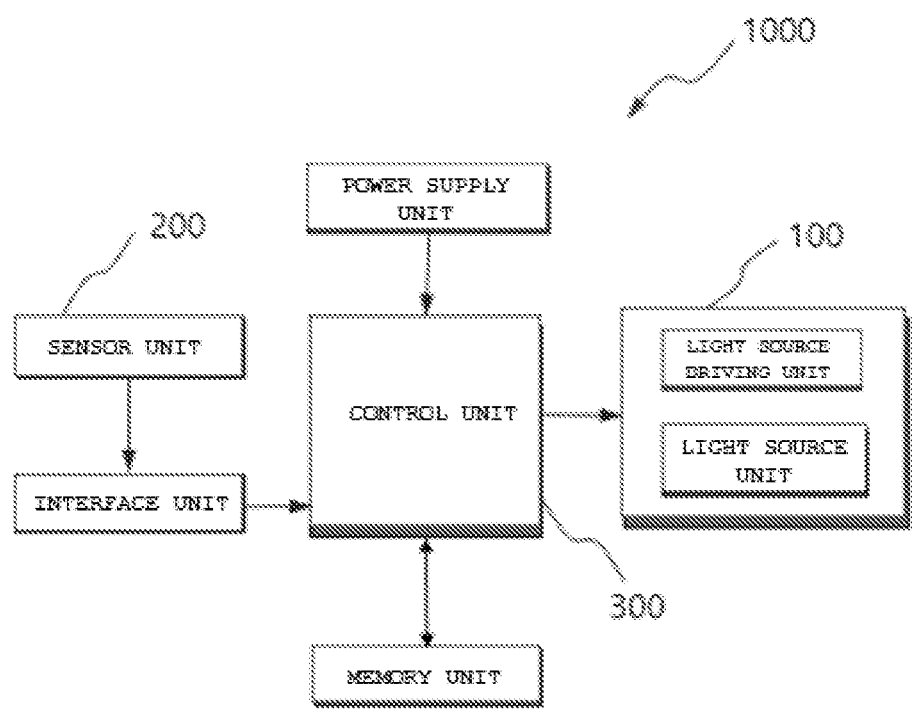
FIG. 2 is a diagram illustrating a configuration of a lamp system according to an embodiment of the present invention.

FIG. 2 is a diagram illustrating a configuration of a lamp system according to an embodiment of the present invention.

Figure 3:
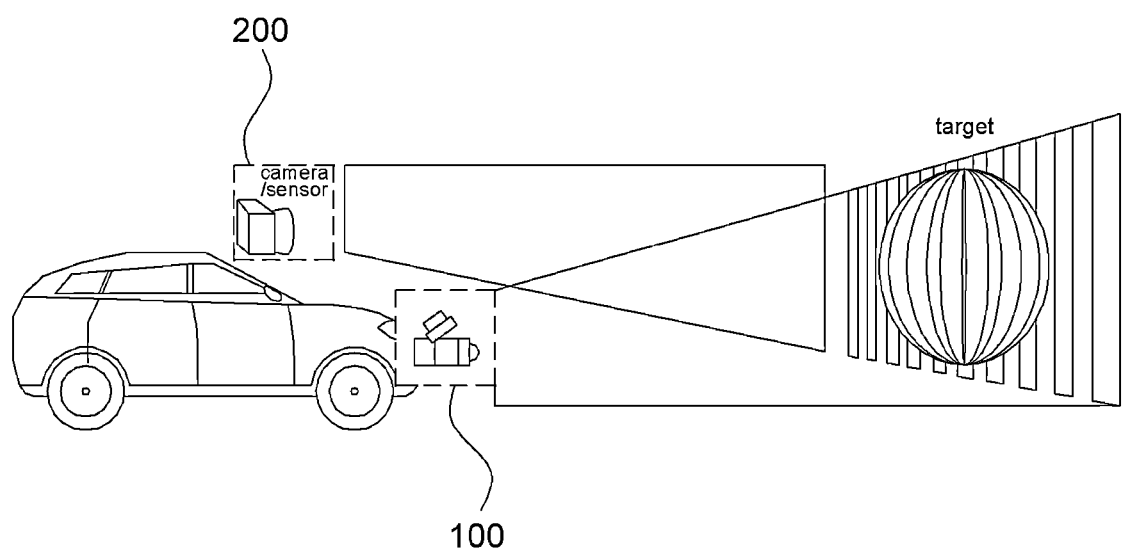
FIG. 3 is a diagram illustrating a state in which the lamp system according to an embodiment of the present invention is provided in a mobile body.

FIG. 3 is a diagram illustrating a state in which the lamp system according to an embodiment of the present invention is provided in a mobile body.

A lamp system 1000 according to an embodiment of the present invention will be described with reference to FIGS. 2 and 3.

As illustrated in FIG. 2, the lamp system 1000 according to an embodiment of the present invention provided in a mobile body may include a light projecting device 100, a sensor unit 200, and a control unit 300.

The light projecting device 100 may include a light source that generates patterned light having a specific pattern and projects the patterned light onto a projection surface.

The sensor unit 200 may include a camera, and the camera may capture a pattern in which the patterned light is projected onto the projection surface to provide an image of the projection surface.

The control unit 300 may calculate a three-dimensional shape of the projection surface based on the output of the sensor unit 200, and control the output of the light projecting device 100 according to the calculated three-dimensional shape of the projection surface.

As a specific example, since the lamp system 1000 according to an embodiment of the present invention may be provided in the mobile body, the light projecting device 100 may include a headlight provided in the mobile body as a light source means. Accordingly, the light projecting device 100 may include a high-resolution device such as a digital micromirror device (DMD) and an HD micro LED.

In addition, the lamp system 1000 may further include a power supply unit, an interface unit, and a memory unit.

The power supply unit receives electrical energy from the mobile body and supplies power to the control unit 300.

The interface unit may receive a sensing value from the sensor unit 200 and transmit the input sensing value to the control unit 300.

The memory unit may transmit and receive image information to and from the control unit 300 and store the image information.

Therefore, in the lamp system 1000 according to an embodiment of the present invention, as illustrated in FIG. 3, the light projecting device 100 may project the patterned light, and the sensor unit 200 may capture the pattern projected onto the projection surface.

Figure 4:
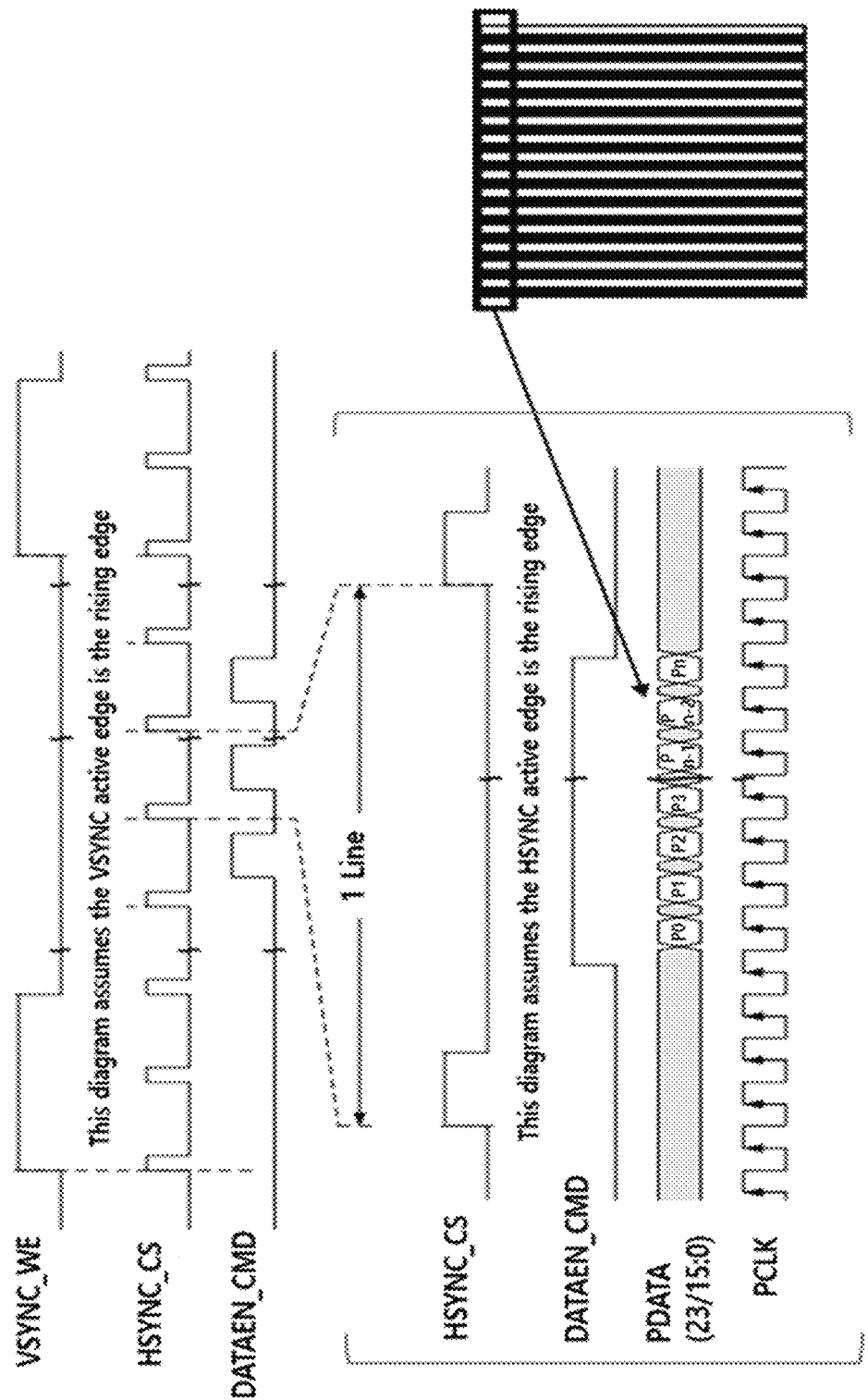
FIG. 4 is a diagram illustrating a process of generating patterned light according to the present invention.

FIG. 4 is a diagram illustrating a process of generating patterned light according to the present invention.

As illustrated in FIG. 4, the light projecting device 100 may generate the patterned light.

Specifically, in order for the light projecting device 100 to generate the patterned light, the control unit 300 may provide one-line data of pattern data about the patterned light to the light projecting device 100 during a horizontal synchronization (HSYNC) period, and provide one-frame data to the light projecting device 100 during one vertical synchronization (VSYNC) period. Here, the HSYNC refers to a signal indicating a starting point when one line starts, and the VSYNC refers to a signal indicating a starting point when one frame starts.

When the patterned light is generated using the method of FIG. 4, the light projecting device 100 may output the generated patterned light.

Figure 5:
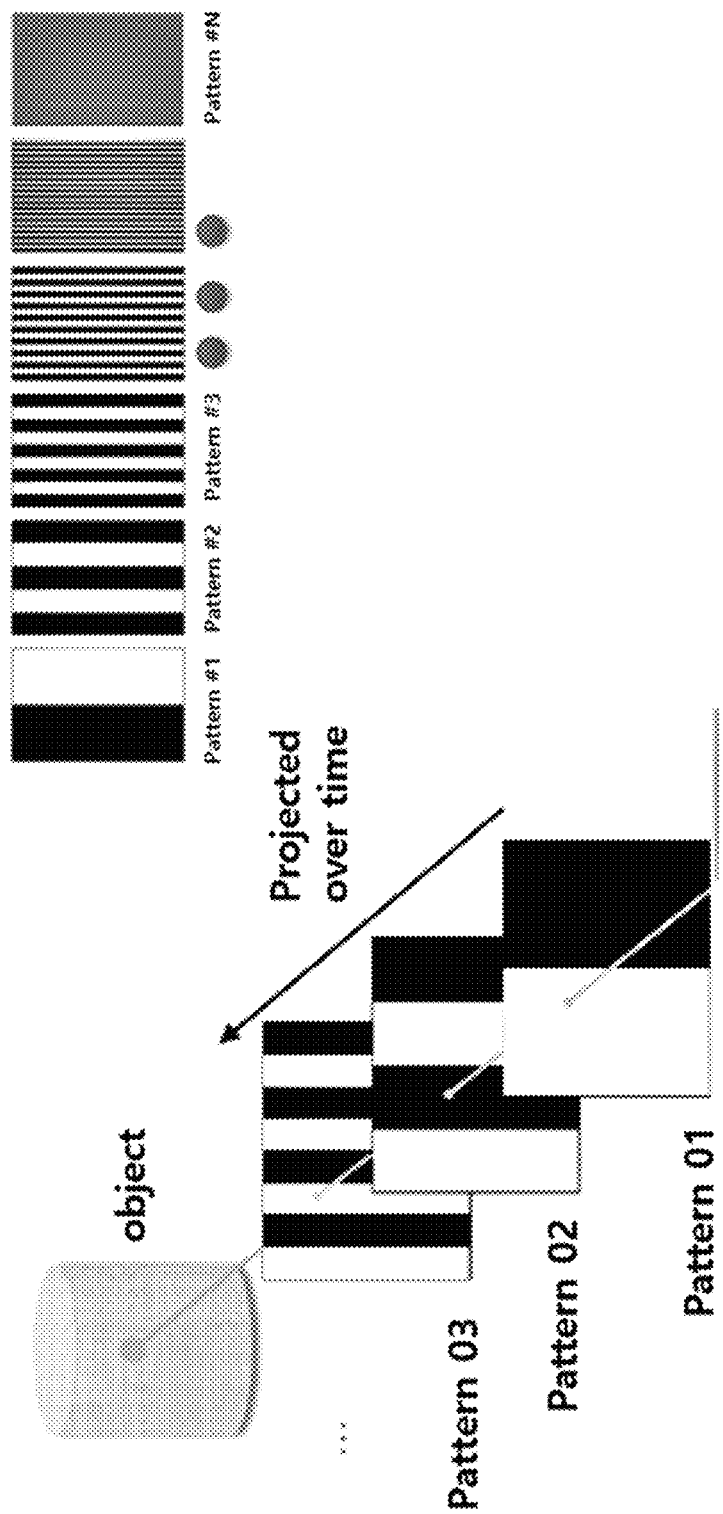
FIG. 5 is a diagram illustrating an output of the patterned light according to the present invention.

FIG. 5 is a diagram illustrating the output of the patterned light according to the present invention.

As illustrated in FIG. 5, the control unit 300 may control the light projecting device 100 so that the light projecting device 100 outputs light with a plurality of patterns having different widths at predetermined time intervals. As a result, it is possible to improve the accuracy of the control unit 300 in calculating stereoscopic information on the projection surface.

Figure 6:
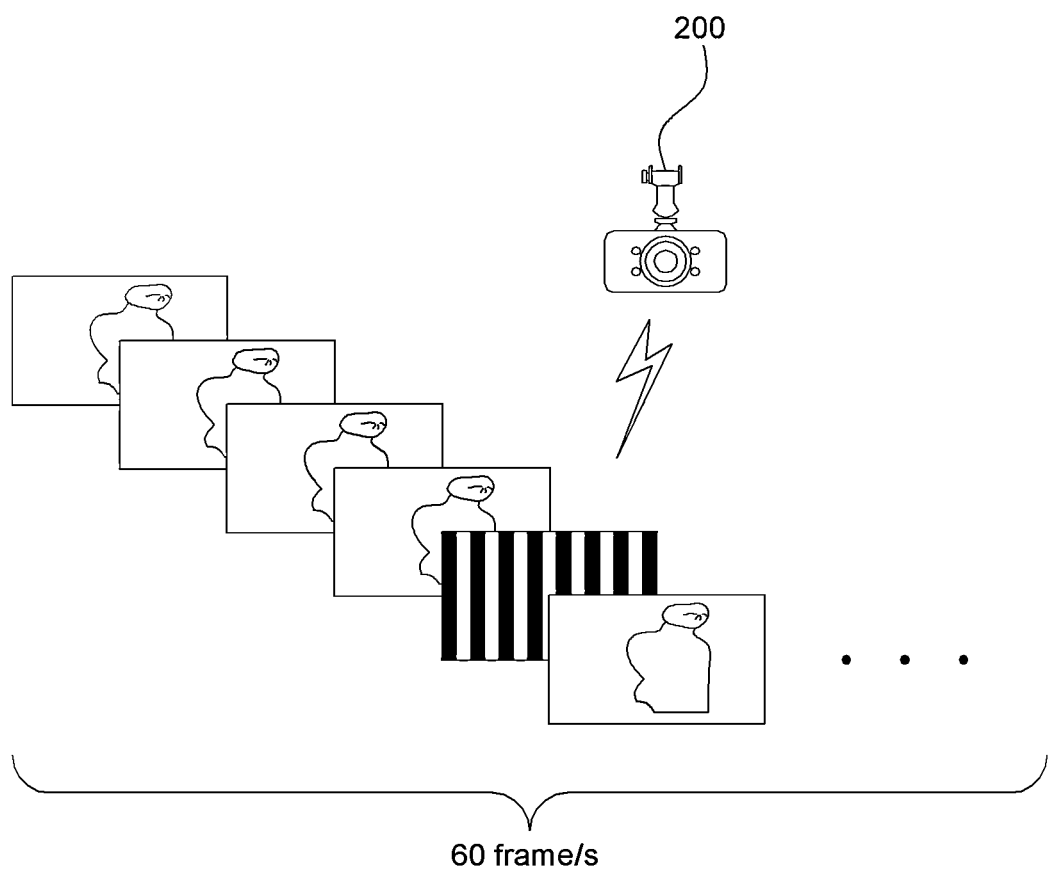
FIG. 6 is a diagram illustrating a method for detecting a stereoscopic shape of a projection surface according to the present invention.

FIG. 6 is a diagram illustrating a method for detecting a stereoscopic shape of a projection surface according to the present invention.

If 30 images are output per second, the human eye may recognize the 30 images as one image. Therefore, in order to detect a stereoscopic shape of a projection surface while images are output, the frame rate of the light projecting device 100 may be set to 30 frame/s or more as illustrated in FIG. 6, and the control unit 300 may control the light projecting device 100 so that the light projecting device 100 outputs the patterned light between predetermined image frames rather than outputting light with a plurality of patterns. As a result, the control unit 300 can acquire stereoscopic information on the projection surface.

Specifically, the control unit 300 may acquire a three-dimensional shape by analyzing an image including the pattern among input images of the projection surface.

Figure 7:
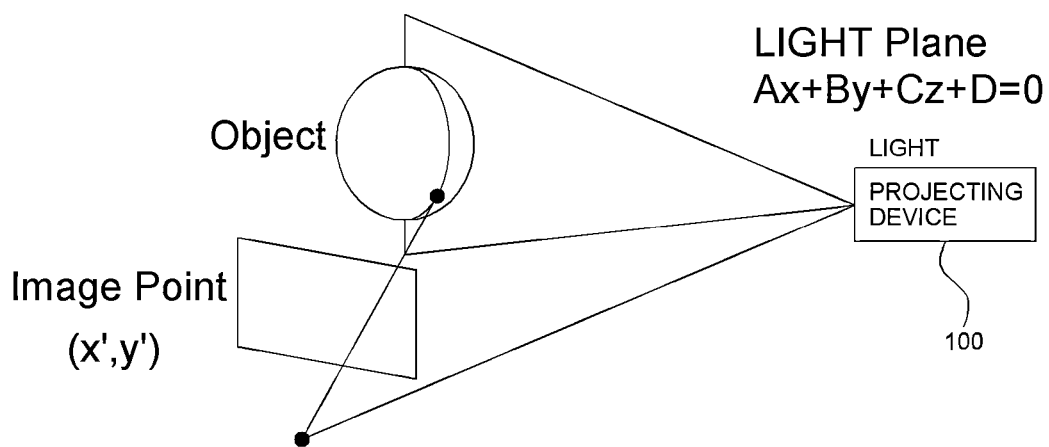
FIG. 7 is a diagram illustrating a method of obtaining coordinates in a three-dimensional image according to the present invention.

FIG. 7 is a diagram illustrating a method of obtaining coordinates in a three-dimensional image according to the present invention. As illustrated in FIG. 7, the control unit 300 may calculate a point cloud (a set of points) by applying a 3D algorithm. More specifically, the control unit 300 may recognize the pattern projected from the light projecting device 100, and derive an equation of one straight line for each pixel of the pattern using the scheme of FIG. 7, thereby calculating an equation of one plane. Based on an intersection point between one point on the pattern and the derived plane, a coordinate value of a point in the three-dimensional image may be calculated. When this process is performed for all coordinates of the entire pattern acquired by the control unit 300, the point cloud may be acquired.

Figure 8:
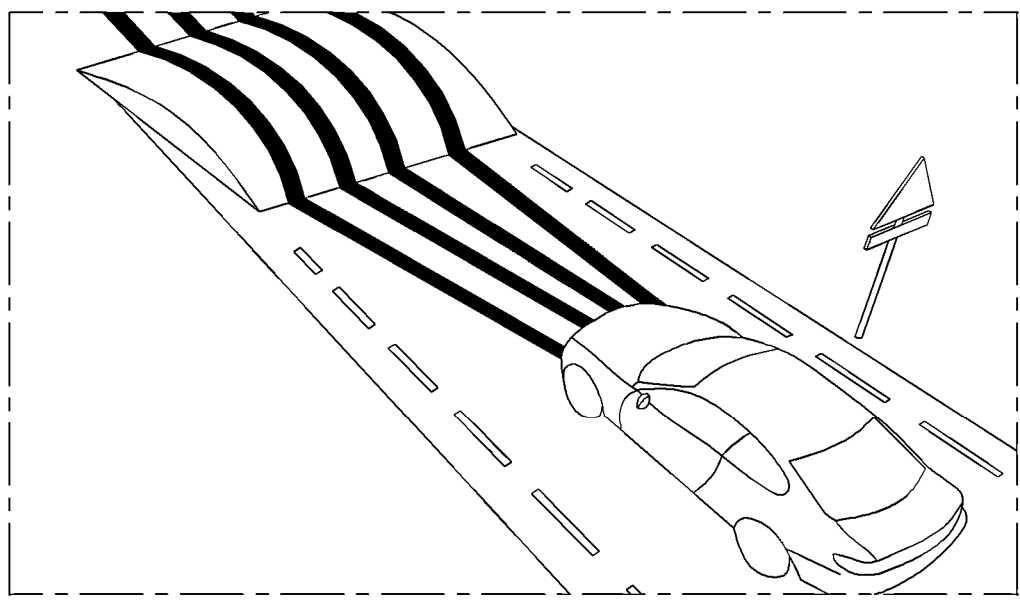
FIG. 8 is a diagram illustrating leveling control according to the present invention.

FIG. 8 is a diagram illustrating leveling control according to the present invention.

As illustrated in FIG. 8, the control unit 300 may detect a tilt of the projection surface based on the stereoscopic information on the projection surface including information about the distorted pattern shape of the patterned light projected onto the projection surface. Therefore, the control unit 300 may automatically adjust a projection angle of the light projecting device 100 by operating a leveling motor included in the mobile body.

Figure 9C:
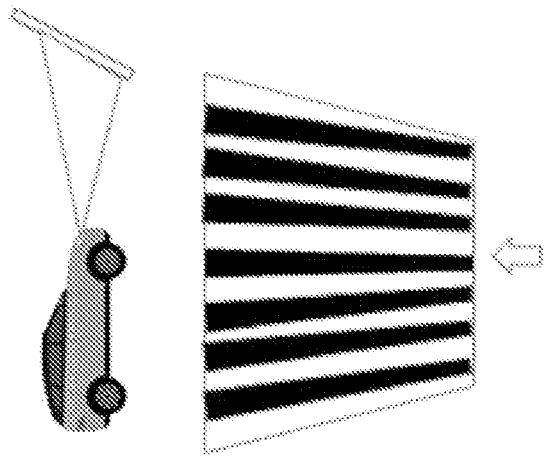
FIGS. 9A to 9C are diagrams illustrating how patterned light is distorted depending on a tilt of the projection surface.
Figure 9B:
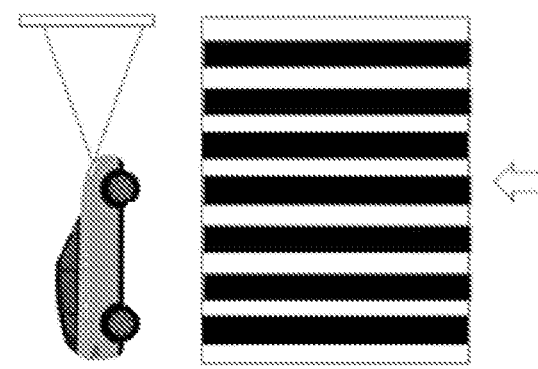
Figure 9A:
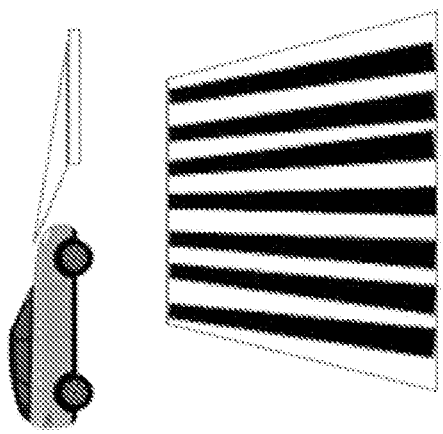

FIGS. 9A to 9C are diagrams illustrating how the patterned light is distorted depending on the tilt of the projection surface.

FIGS. 9A to 9C are different from each other in pattern. The pattern appears differently depending on the tilt of the projection surface, and accordingly, the control unit 300 may detect a tilt of the projection surface based on the stereoscopic information on the projection surface including the pattern shape of the patterned light projected onto the projection surface. As a result, the control unit 300 may control the light projecting device 100 so that the output of the light projecting device 100 is corrected not to be distorted.

Figure 10:
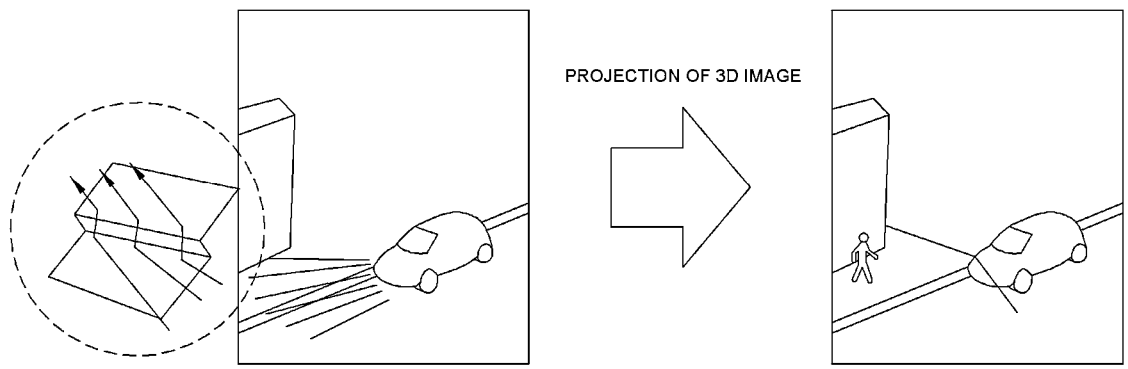
FIG. 10 is a diagram illustrating projection of a 3D image according to the present invention.

Furthermore, FIG. 10 is a diagram illustrating projection of a 3D image according to the present invention.

As illustrated in FIG. 10, the control unit 300 may detect different stereoscopic surfaces of the projection surface based on the stereoscopic information on the projection surface including the pattern shape of the patterned light projected onto the projection surface. Accordingly, the control unit 300 may correct the output of the light projecting device 100 to project different images on the different stereoscopic surfaces, respectively.

Although the preferred embodiments of the present invention have been described above, the embodiments disclosed herein are not intended to limit the technical idea of the present invention, but are provided to explain the technical idea of the present invention. Therefore, the technical idea of the present invention includes not only each of the embodiments disclosed herein but also a combination of the embodiments disclosed here, and furthermore, the scope of the technical idea of the present invention is not limited by these embodiments. In addition, those skilled in the art to which the present invention pertains may make numerous changes and modifications to the present invention without departing from the spirit and scope of the appended claims, and all of such appropriate changes and modifications shall be regarded as falling within the scope of the present invention as equivalents.

What is claimed is:

1. A lamp system provided in a mobile body, the lamp system comprising:
a light projecting device including a light source configured to generate patterned light having a specific pattern and to project the patterned light onto a projection surface;
a sensor unit including a camera configured to capture images of the projection surface that include the patterned light; and
a control unit that configured to determine a three-dimensional shape of the projection surface based on the images from the sensor unit, and to control an output of the light projecting device according to the determined three-dimensional shape of the projection surface,
wherein the control unit is configured to generate one-line data of pattern data for the patterned light and to provide the one-line data to the light projecting device during a horizontal synchronization (HSYNC) period, and to generate one-frame data and provide the one-frame data to the light projecting device during one vertical synchronization (VSYNC) period, the one-line data and the one-frame data being used by the light projecting device to generate the patterned light.

2. The lamp system of claim 1, wherein the control unit is configured to control the light projecting device to output light with a plurality of patterns having different widths at predetermined time intervals.

3. The lamp system of claim 1, wherein the control unit is configured to control the light projecting device to output the patterned light between predetermined image frames.

4. The lamp system of claim 1, wherein the control unit is configured to determine the three-dimensional shape of the projection surface by extracting an image having the patterned light from the images of the projection surface, and to analyze the extracted image.

5. A lamp system provided in a mobile body, the lamp system comprising:
a light projecting device including a light source configured to generate patterned light having a specific pattern and to project the patterned light onto a projection surface;
a sensor unit including a camera configured to capture images of the projection surface that include the patterned light; and
a control unit that configured to determine a three-dimensional shape of the projection surface based on the images from the sensor unit, and to control an output of the light projecting device according to the determined three-dimensional shape of the projection surface,
wherein the control unit is configured to determine the three-dimensional shape of the projection surface by extracting an image having the patterned light from the images of the projection surface, and to analyze the extracted image, and
wherein the control unit is configured to determine the three-dimensional shape of the projection surface by deriving an equation of a straight line and an equation of a plane in a three-dimensional space for each pixel in the extracted image, and to determine a coordinate value of a point in a three-dimensional image based on an intersection point between the point in the extracted image and the derived plane.

6. A lamp system provided in a mobile body, the lamp system comprising:
a light projecting device including a light source configured to generate patterned light having a specific pattern and to project the patterned light onto a projection surface;
a sensor unit including a camera configured to capture images of the projection surface that include the patterned light; and
a control unit that configured to determine a three-dimensional shape of the projection surface based on the images from the sensor unit, and to control an output of the light projecting device according to the determined three-dimensional shape of the projection surface,
wherein the control unit is configured to determine the three-dimensional shape of the projection surface by extracting an image having the patterned light from the images of the projection surface, and to analyze the extracted image, and
wherein the control unit is configured to detect a tilt of the projection surface based on stereoscopic information on the projection surface, and to correct the output of the light projecting device based on the tilt of the projection surface.

7. A lamp system provided in a mobile body, the lamp system comprising:

a light projecting device including a light source configured to generate patterned light having a specific pattern and to project the patterned light onto a projection surface;

a sensor unit including a camera configured to capture images of the projection surface that include the patterned light; and a control unit that configured to determine a three-dimensional shape of the projection surface based on the images from the sensor unit, and to control an output of the light projecting device according to the determined three-dimensional shape of the projection surface, wherein the control unit is configured to determine the three-dimensional shape of the projection surface by extracting an image having the patterned light from the images of the projection surface, and to analyze the extracted image, and wherein the control unit is configured to detect a tilt of the projection surface based on stereoscopic information on the projection surface, and to control a projection angle of the light projecting device by operating a leveling motor included in the mobile body based on the tilt of the projection surface.

8. The lamp system of claim 4, wherein the control unit is configured to detect different stereoscopic surfaces of the projection surface based on stereoscopic information on the projection surface, and to control the light projecting device to project different images on the different stereoscopic surfaces, respectively, based on the different stereoscopic surfaces.

* * * * *